April 30, 1968  H. C. A. VAN DUUREN  3,381,271
TRANSPOSITION ERROR PROTECTION SYSTEM FOR TELEGRAPH SIGNALS
Filed May 8, 1964  4 Sheets-Sheet 1
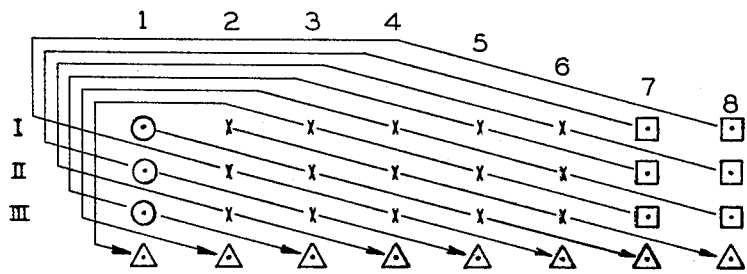
FIG. 1
FIG. 2
FIG. 8
INVENTOR.
H. C. A. VAN DUUREN
BY
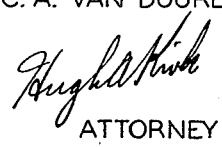
ATTORNEY

|    | A B | C D E |      | f | a b | c d e | g |
|----|-----|-------|------|---|-----|-------|---|
| 0  | 0 0 | 0 0 0 |      | X | 0 0 | X X 0 | 0 |
| 1  | X 0 | 0 0 0 |      | X | X 0 | 0 0 0 | X |
| 2  | 0 X | 0 0 0 |      | X | 0 X | 0 0 0 | X |
| 3  | X X | 0 0 0 |      | 0 | X X | 0 0 0 | X |
| 4  | 0 0 | X 0 0 |      | X | 0 0 | X 0 0 | X |
| 5  | X 0 | X 0 0 |      | 0 | X 0 | X 0 0 | X |
| 6  | 0 X | X 0 0 |      | X | 0 X | X 0 0 | 0 |
| 7  | X X | X 0 0 |      | 0 | X X | X 0 0 | 0 |
| 8  | 0 0 | 0 X 0 |      | X | 0 0 | 0 X 0 | X |
| 9  | X 0 | 0 X 0 |      | X | X 0 | 0 X 0 | 0 |
| 10 | 0 X | 0 X 0 |      | 0 | 0 X | 0 X 0 | X |
| 11 | X X | 0 X 0 |      | 0 | X X | 0 X 0 | X |
| 12 | 0 0 | X X 0 |      | 0 | 0 0 | X X 0 | X |
| 13 | X 0 | X X 0 |      | 0 | X 0 | X X 0 | 0 |
| 14 | 0 X | X X 0 |      | 0 | 0 X | X X 0 | 0 |
| 15 | X X | X X 0 |      | X | 0 X | 0 X 0 | 0 |
| 16 | 0 0 | 0 0 X |      | X | 0 0 | 0 0 X | X |
| 17 | X 0 | 0 0 X |      | 0 | X 0 | 0 0 X | X |
| 18 | 0 X | 0 0 X |      | 0 | 0 X | 0 0 X | X |
| 19 | X X | 0 0 X |      | 0 | X X | 0 0 X | 0 |
| 20 | 0 0 | X 0 X |      | 0 | 0 0 | X 0 X | X |
| 21 | X 0 | X 0 X |      | 0 | X 0 | X 0 X | 0 |
| 22 | 0 X | X 0 X |      | 0 | 0 X | X 0 X | 0 |
| 23 | X X | X 0 X |      | X | 0 X | 0 0 X | 0 |
| 24 | 0 0 | 0 X X |      | 0 | 0 0 | 0 X X | X |
| 25 | X 0 | 0 X X |      | 0 | X 0 | 0 X X | 0 |
| 26 | 0 X | 0 X X |      | 0 | 0 X | 0 X X | 0 |
| 27 | X X | 0 X X |      | X | X 0 | 0 0 X | 0 |
| 28 | 0 0 | X X X |      | 0 | 0 0 | X X X | 0 |
| 29 | X 0 | X X X |      | X | 0 0 | 0 X X | 0 |
| 30 | 0 X | X X X |      | X | 0 0 | X 0 X | 0 |
| 31 | X X | X X X |      | X | X 0 | X 0 0 | 0 |
| 32 | X 0 | X 0 X | sig I | X | X X | 0 0 0 | 0 |
| 33 | 0 0 | 0 0 0 | α    | 0 | X 0 | 0 X 0 | X |
| 34 | 0 0 | 0 0 X | β    | 0 | 0 X | X 0 0 | X |

FIG. 3

TRANSMITTER

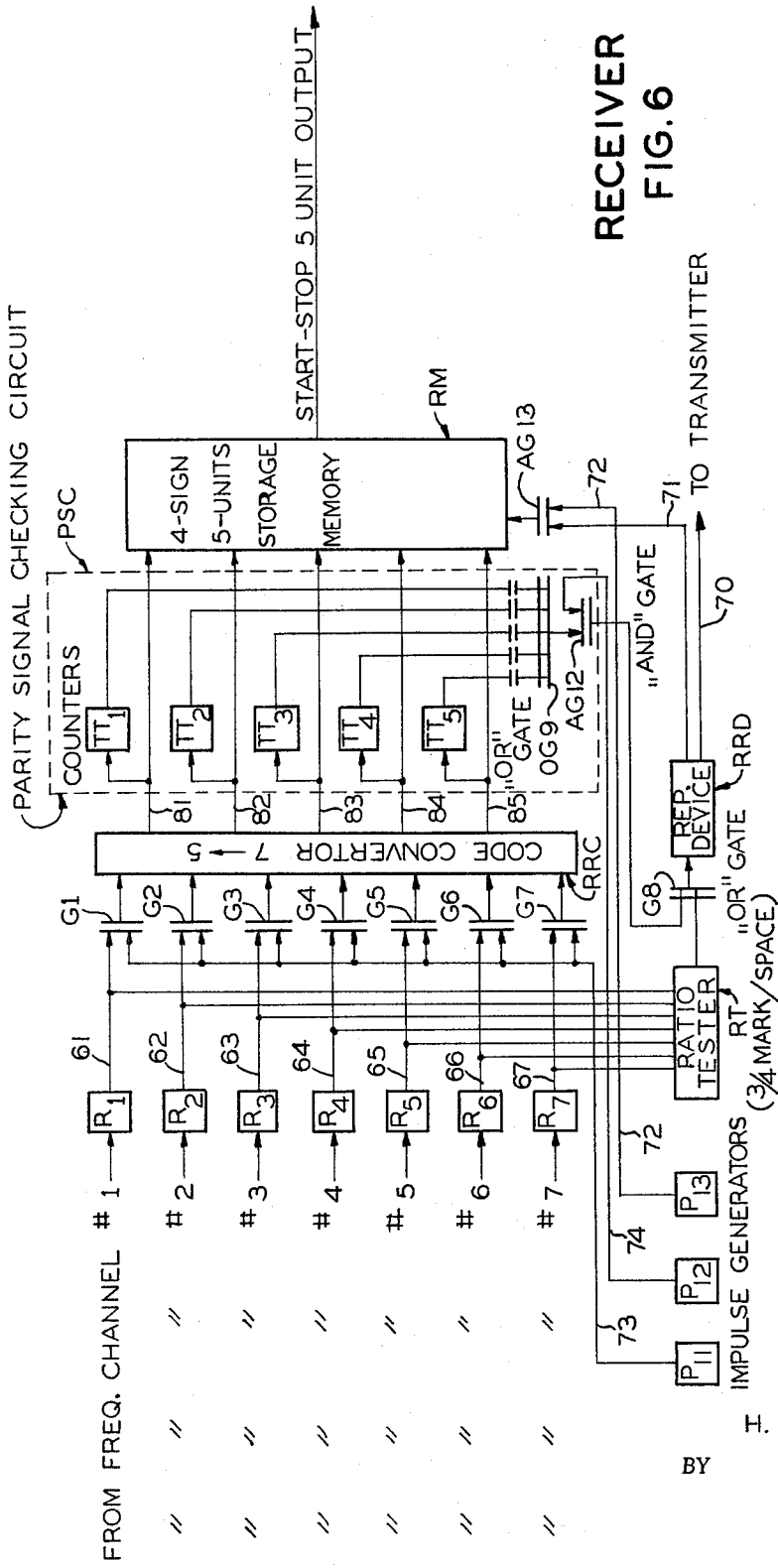

United States Patent Office 3,381,271
Patented Apr. 30, 1968

---

3,381,271
TRANSPOSITION ERROR PROTECTION SYSTEM FOR TELEGRAPH SIGNALS
Hendrik Cornelis Anthony van Duuren, Wassenaar, Netherlands, assignor to De Staat der Nederlanden, ten Deze Vertegenwoordigd Door de Directeur-Generaal der Posterijen, Telegrafie en Telefonie, The Hague, Netherlands
Continuation-in-part of application Ser. No. 187,566, Apr. 16, 1962. This application May 8, 1964, Ser. No. 365,898
12 Claims. (Cl. 340—146.1)

ABSTRACT OF THE DISCLOSURE

A system for preventing transposition errors in a two-way telegraph system comprising generating a parity check signal for each block or group of lines of binary code telegraph signals. This system includes a transmitter and a receiver at each station each of which has a storing means, a repetition device, and a counter means for generating and detecting, respectively, a parity check signal for the lines of multi-element code signals in each block or group. If desired, each transmitter and receiver may include also a code converter for converting each multi-element signal into a constant-ratio binary code multi-element signal for further error detection. The lines of each block or group of signals for generating the parity check signal, may be taken from parallel rows, columns, and/or diagonals of either the original or the code converted signals.

---

This application is a continuation-in-part application of Van Duuren's copending U.S. patent application Ser. No. 187,566, filed Apr. 16, 1962, which claims priority from Netherlands application Ser. No. 264,766 filed May 15, 1961.

*Background of the invention*

Previously, protection against faulty reception has been achieved by working with constant ratios of signal elements of different natures in the signals transmitted. Systems of this type proved susceptible to a particular kind of error consisting in the falling out of a marking element and the simultaneous appearance of a marking element, instead of a spacing element, in another place. Such a transposition cannot be detected by these well known protection systems.

*Summary of the invention*

Generally speaking, the telecommunication system of this invention is for protection against slipping in of errors due to transposition in multi-element code signals transmitted between at least two stations in a network, each of which stations has an associated transmitter and receiver for two-way communication. Besides the necessary circuits for telecommunication of the signals, each transmitter and receiver at each station comprises: a separate input circuit for each element of each signal transmitted and received, a storing means for a predetermined number of signals usually at least the number contained in a block or group of signals which is parity checked according to the system of this invention, separate conductor means between each input circuit and the storing means, and a repetition device for controlling the storing means.

The improvement of this invention is characterized by counter means in each transmitter and receiver, which counter means are connected to each conductor means for counting the number of elements of a given type or polarity in a predetermined number of signals which form the group or block signals parity checked according to this invention. In combination with these counter means, means are provided in each transmitter connected to the counter means at said transmitter for generating the special, additional, checking or parity signal indicating the odd or even number of marks or spaces in particular columns, rows, or diagonal lines of elements in said block. Then also at each receiver there is provided means connected to each of the counter circuits for comparing, testing or checking the parity signal against the corresponding elements counted in the same columns, rows or diagonal lines of the block of signals received, to insure that the block was not erroneously received. If an error is detected the associated repetition device is signalled to request repetition of that block of signals until it is properly received. The re-transmission of the block of signals from the storing means in the transmitter also includes the retransmission of its associated parity signal.

In addition to the above basic circuits of this invention there also may be employed in each transmitter and receiver a plurality of gate means, including OR gates, in each of said conductor means, and a pulse generator means for controlling the said gate means for permitting passing and spacing of the elements of the signals as they pass through the circuits in the proper sequence and order, whereby the groups or blocks of signals may be counted and spaces left between them for the transmission of the special, checking, or parity signals. Furthermore, each transmitter and receiver may also include a code converter means, if each of the signals is to be converted into a constant mark/space ratio signal for further checking each of the signals, as well as the block of signals parity checked according to the circuits of this invention. In such a case, the receiver circuits include a signal ratio tester circuit for checking this constant ratio, which tester circuit is connected to the repetition device so that erroneously received signals could be requested by repetition.

Still further, the system of this invention may comprise a multi-channel system in which each one of the elements of each signal being transmitted may be transmitted on a separate signal channel and/or at a different frequency for further insuring protection against errors.

*(a) Objects and advantages*

Accordingly it is an object of this invention to provide a system for the prevention of transposition errors.

Another object is to produce such a system by checking groups of elements in a predetermined number, group, or block of signals.

Another object is to produce such a protection system by transmitting a checking or parity signal after each checked group or block of signals or signal elements.

Another object is to produce such a system in which the signals are checked at least twice for a constant ratio of mark/space elements, namely for each message signal and for each block or group of signals, and may also be further checked by checking the parity signal either of constant mark/space ratio, or with an additional check-ing element therein, or both.

*Brief description of the drawings*

The above mentioned and other features and objects of this invention and the manner of attaining them will become more apparent and the invention itself will be understood best by reference to the following description of embodiments of the invention taken in conjunction with the accompanying drawings, wherein:

FIG. 1 discloses charts of a group of four five-element message signals together with a parity signal derived therefrom according to one embodiment of the system of this invention, plus (at the right) a group of seven-element constant ratio mark/space code signals converted from the block of five signals at the left;

FIG. 2 discloses charts similar to FIG. 1, but with the parity signal derived from the first six elements of the constant ratio code converted signals, plus a final or seventh self-checking element according to another embodiment of the system of this invention;

FIG. 3 is a code conversion table between the five-element signals and constant ratio seven-element signals shown in the charts of FIGS. 1 and 2;

FIG. 6 is a schematic block wiring diagram of a receiver circuit for receiving the groups and parity signals shown according to the charts of FIG. 1 and transmitted by the circuit of FIG. 4;

FIG. 7 is a time diagram of the pulse waves employed in controlling the receiver circuit shown in FIG. 6; and FIG. 8 is a chart of a group or block signals including a parity signal derived according to a still further embodiment of this invention, showing three eight-element message signals and one eight-element parity signal derived from the three message signals by diagonal lines through their block of elements.

- *Detailed description of preferred embodiments*

(I) THE SIGNALS

Figure 4:
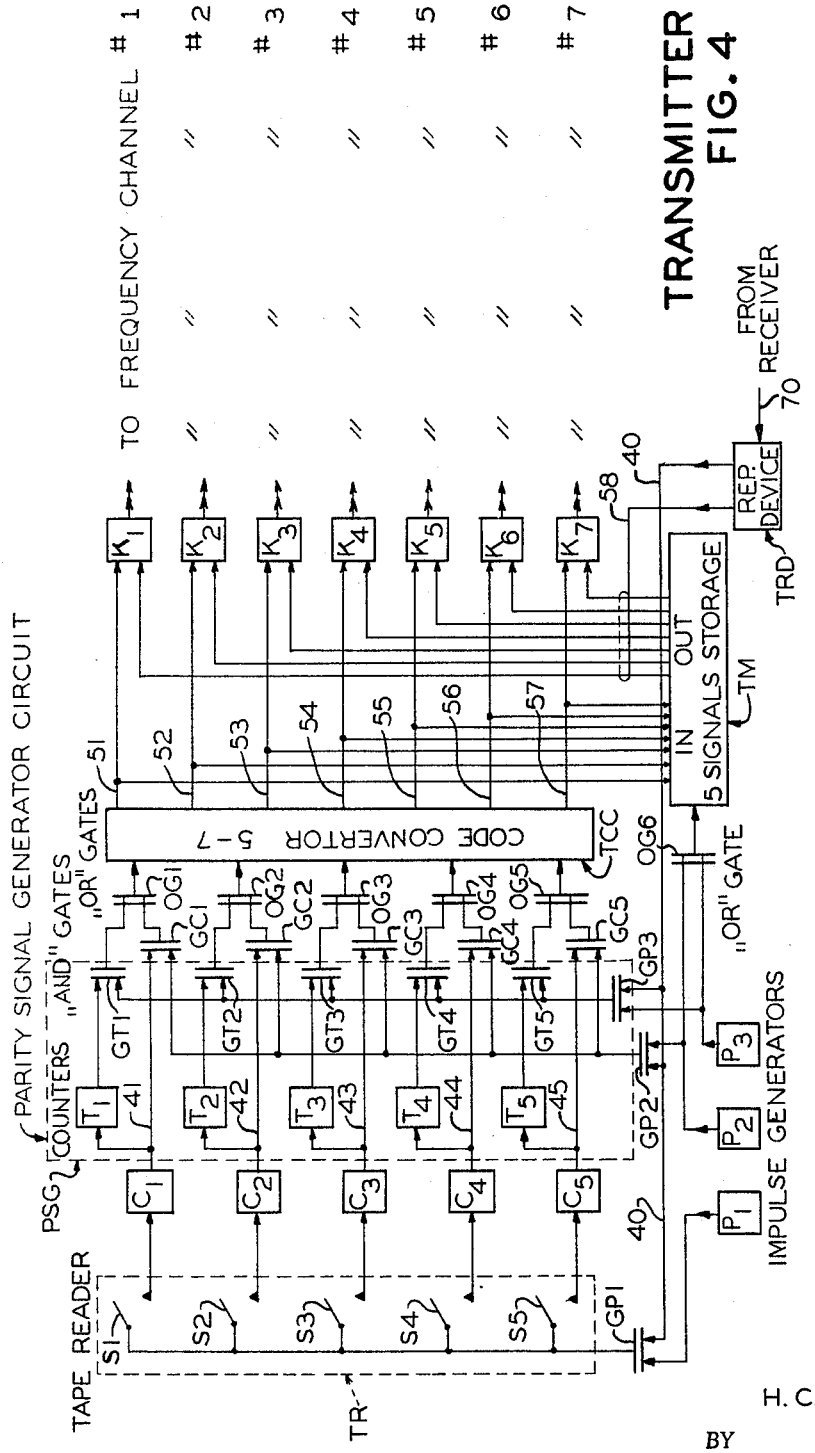
FIG. 4 is a schematic block wiring diagram of a transmitter circuit for producing the groups or blocks and parity signals according to the embodiment shown in FIG. 1.

The multi-element signals communicated by this invention all have the same number of elements per signal, so that a group thereof forms a block of elements in rows and columns from which the parity or checking signal is produced. The parity signal is composed of elements determined from the number of elements of like order in each line, column, row, or diagonal of elements in such a block. For example, none or an even number of marking elements in a line may be indicated by a mark element in a certain element position in the parity signal, while an odd number of marking elements in that line would be indicated by a space element. Then each element position in the parity signal contains an element for a different line row, or column in the block, or an element based on the number of marks in the rest of its own signal. This invention, however, is not limited to just mark and space criterions, in that separate frequencies can be employed for each element and/or its position in each signal, or in each block.

However, for the purposes of illustration herein, reference is first had to FIG. 1 which shows charts of two blocks of signals, the one at the left comprising four horizontal rows of four five-element telegraph code message signals, such as according to the Baudot Code, each of the five vertical columns in which block contains an even or no marking elements X, which is indicated by a mark at the bottom of each column to make up the five-element parity signal across the bottom of the block under the horizontal line, which block of five five-element signals is transmitted by the system of this invention. At the right half of FIG. 1, the five rows of signals are shown converted into a seven-unit code in which each signal or horizontal row of elements contains a constant ratio of marks and spaces, namely three marks and four spaces, including the elements in the parity signal. This block of five rows and seven columns of elements is then transmitted so that not only is each signal thereof checked along the rows for constant ratio, but after the block is reconverted back into the five-element signals shown at the left of FIG. 1, the number of marks in each column are also checked or compared to determine if they correspond with the reconverted parity signal, at the bottom of this five-element block. It should be noted in this embodiment of the invention, that the converted parity signal underneath the horizontal line in the right-hand block in FIG. 1 does not contain elements which correspond with the number of marks or spaces in the columns $f1$ through $f7$.

In FIG. 2 there is shown by charts of blocks of elements how another type of parity signal may be produced employing the same four five-element signals in the left hand block as shown in FIG. 1, but converting these four signals into the seven-element constant ratio code before producing the parity signal, so that the parity signal is derived from the block of seven-element signals. For example, the first six vertical columns of elements in the seven-element code are employed for making up the first six-elements of the parity signal shown in row $b$. Then the last or seventh element in the row $b$ is determined from the odd or even number of mark elements in the six elements already formed in the parity signal, to act as a further check element for the parity signal $b$ itself. Also this seventh element may be used to insure a constant mark/space ratio for the parity signal. Thus according to FIG. 2, the block of the thirty-five elements comprises five seven-element signals, for which the parity check or test is made before the conversion at the receiver of the first four or message signals into their five-element code signals.

In FIG. 3 there is shown a conversion table for thirty-two, 0 through 31, five-element code signals in columns A through E in to their corresponding seven-element constant ratio code signals in columns $a$ through $g$, and vice versa. According to the 3/4 mark/space combinations and permutations of seven elements, thirty-five different signals are possible, which is three more than in the 5 five-element code, which three additional signals are shown at the bottom of these columns $a$ through $g$ as special signal I and idle time signals "α" and "β." In re-converting these three additional signals back to the original five-element code, they have been so chosen that out of the list of already existing thirty-two signals they can only be confused with the one other similar signal, if as many transpositions as possible occure in the seven-element signal. Thus only double transpositions in each signal during the transmission of these three seven-element signals could cause them to be confused with their similar converted five-element signals, which effects further protection against errors.

(II) THE TRANSMITTER

Referring now to FIG. 4 there is shown a schematic block wiring diagram of a transmitter circuit for one of the stations for the transmission of four information signals plus a parity test or checking signal in accordance with the blocks of elements disclosed in FIG. 1. The five elements of the four information or message signals are read simultaneously from the tape reader TR shown at the left end of FIG. 4, triggered by a pulse from pulse generator P 1 through AND gate GP 1 in combination with a potential from the repetition device TRD indicating that a repetition is not being requested through conductor 40. The information from each of the five elements on the tape is then transmitted, such as through the feeler switches S 1 through S 5, to the corresponding bistable triggers C 1 through C 5 until changed by a following different impulse from the tape reader TR are applied to them.

Figure 5:
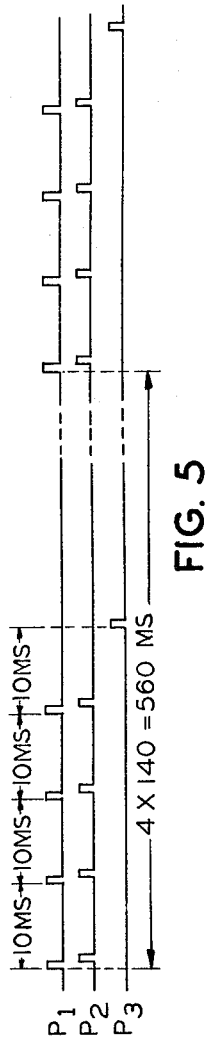
FIG. 5 is a time diagram of the pulse waves employed for controlling the transmitter circuit shown in FIG. 4.

The information from these trigger circuits C 1 through C 5 is then transmitted through conductors 41, 42, 43, 44 and 45, respectively, to AND gates GC 1, GC 2, GC 3, GC 4 and GC 5, controlled by a pulse from pulse generator P 2 through AND gate GP 2, right after completion of operation of pulse P 1, as indicated by the pulse waves P 1 and P 2 shown in FIG. 5. AND gate GP 2 is also controlled by the repetition device TRD, so that when a repetition is not being requested, the then constant potential in conductor 40 also is applied to the GP 2.

Connected also to the conductors 41 through 45, respectively, are separate counter circuits T 1 through T 5 which make up part of the checking or parity signal generator circuit PSG. According to FIG. 1 these counters T 1 through T 5 count if the number of mark elements occurring for four signals in its corresponding column, position or conductor is odd or even, to produce a space or mark element, respectively, in that position for the parity signal. The final outputs of each of these counters T 1 through T 5 are passed through AND gates GT 1 through GT 5, respectively, by a pulse from generator P 3 through AND gate GP 3, also controlled as gates GP 1 and GP 2 by the potential in conductor 10 from the repetition device TRD. This pulse P 3 (see wave forms in FIG. 5) occurs after all four message signals making up the group or block have been passed through the code converter TCC via AND gates GC 1 through GC 5 and OR gates OG 1 through OG 5. This code converter TCC comprises logic circuits for converting the five element code signals into seven element code signals having a constant mark/space ratio according to the table shown in FIG. 3. Also connected to these OR gates OG 1 through OG 5, respectively, are the outputs of the AND gates GT 1 through GT 5 of the parity signal generator circuit, so that then under the control of pulse P 3 the proper parity signal determined by the counters T 1 through T 5 is passed to the code converter TCC completing the block of five signals shown at the left in FIG. 1.

From the code converter TCC extend seven conductors 51 through 57 connected both to the five signal storing device TM and to the seven separate output triggers K 1 through K 7, which may be transmitted over seven separate frequencies of seven separate signal channels. Thus all five-element signals are converted into seven element signals which are both stored and passed for transmission each group cycle of the system under control of the pulses from generator P 3. Although such a code converter TCC is not necessary according to the block checking system of this invention, it is necessary if the additional constant ratio test of each one of the signals in the block is also to be provided.

In the event an error occurs and a repetition is required, the repetition device TRD connected through conductor 40 to the gates GP 1, GP 2 and GP 3, also is connected via conductor 58 to the outputs of the storage device TM to permit repetition of the five seven-element signals of the block last recorded therein and also to cut off the potential applied via conductor 40 to block further signals from being read in the tape reader TR by pulse P 1 via Gate GP 1, to block transfer of signals stored in the input trigger C 1 through C 5 from being transferred to the code converter TCC by pulse P 2 via gate GP 2, and to prevent parity signals generated in the counters of T 1 through T 3 from being passed to the code converter TCC, all until the repetition device TRD has been re-set. Furthermore, in order to simultaneously record the five converted signals in the memory circuit TM, the pulse generators P 2 and P 3 are also connected through OR gate OG 6 to the memory device TM for controlling the internal operation or stepping thereof for the sequential storing of these five signals making up the block, as they are converted from the output conductors 51 through 57 from the code converter TCC.

As seen from the time diagram in FIG. 5, the reading by pulse P 1 and code conversion by pulse P 2 lasts four times ten milliseconds, followed by the transmission of the parity test signal controlled by pulse P 3 which lasts ten milliseconds, then the process is repeated after a pause of 510 milliseconds, thus permitting time for the reading and conversion of the six other signals of the seven message channels No. 1 through No. 7 with which the seven elements of each converted signal are interspersed at different frequencies from triggers K 1 through K 7 in FIG. 4.

(III) THE RECEIVER

In FIG. 6 is shown a schematic block wiring diagram of a receiver circuit for receiving the five seven-element signals shown at the right in FIG. 1 and transmitted by the transmitter circuit of FIG. 4, and reconverting them back into the block of five five-element signals shown at the left in FIG. 1 for parity checking.

The seven input or receiving bistable triggers R 1 through R 7, correspond to the seven different elements of each signal received, and may correspond to the seven different frequencies of the seven different channels No. 1 through No. 7 by which the seven elements of each signal is transmitted as shown in FIG. 4. From the output of each of these seven triggers R 1 through R 7 there are provided separate conductors 61 through 67, each of which are connected both to separate AND gates G 1 through G 7, respectively, as well as to the ratio tester circuit RT for testing the constant mark/space (3/4) ratio of all seven of the elements of each one of the signals.

If the ratio is tested to be proper, no potential is passed through OR gate G 8 to the repetition device RRD. However, if on the other hand, one of the signals has been tested to be mutilated or in error, then the repetition device RRD is operated which in turn via conductor 70 operates the local transmitter repetition device TRD (see FIG. 4) to request a repetition of the last signal block. Also at this time potential normally applied from the repetition device RRD in conductor 71 is cut off to the AND gate AG 13, which prevents any pulses from pulse generator P 13 (see also time diagram in FIG. 7) via conductor 72, from passing any stored signals from the output of the memory device RM, such as to a printer.

The conductors 61 through 67 from the input triggers R 1 through R 7 also pass each element of each signal as it is received to the gates G 1 through G 7 which gates are triggered by pulses from pulse generator P 11 (see also time diagram of FIG. 7), via conductor 73. This pulse P 11 permits the elements indicated on the triggers R 1 through R 7, after they have been tested by the radio tester RT, to be passed to the code converter RRC and converted back through logics into the five-element code signals shown at the left in FIG. 1 according to the table in FIG. 3, and are produced on the output conductors 81 through 85 from the converter RRC. Since it is this five-element code which had its elements counted to produce the special checking or parity signal each of these conductors 81 through 85 are connected not only to the four five-element signal storage or memory device RM, but are also connected to a parity signal checking circuit PSC of the separate counters TT 1 through TT 5 which count the number of marks in each element position of the four successive signals making up the block of signals transmitted. At this time each of the counters TT 1 through TT 5 are in a definite position for comparison purposes with the elements of the fifth, checking, or parity signal. Thus, if the counters TT 1 through TT 5 are not changed in their said definite positions by the elements of this fifth or parity signal, the block of four signals counted was correctly received, and no impulse will be passed from any of the counters TT 1 through TT 5 through OR gate OG 9 to AND gate AG 12. If, however, even one of the elements of the parity signal does not compare with the positions of that one of counters TT 1 through TT 5, an error has occurred and an impulse is passed through OR gate OG 9 at the same time a pulse from the pulse generator P 12 (see also FIG. 7) via conductor 74 is applied to the AND gate AG 12 to operate the repetition device RRD. This then causes a request via conductor 70 for the repetition of the last received block of signals, while preventing transfer of any stored signals from the memory device RM via conductor 71 and AND gate AG 13.

IV MODIFICATIONS

In adapting the circuits shown in FIGS. 4 and 6 for a set of signals corresponding to that shown in FIG. 2, wherein the parity signals are produced from the signal after it has passed through the code converter, substantially all that needs to be done is to connect the parity signal generator circuit PSG in the transmitter of FIG. 4 to the conductors 51 through 57 instead of to the conductors 41 through 45 as shown, and correspondingly connect the parity signal checking circuit PSC in the receiver of FIG. 6 to the conductors 61 through 67 instead of to the conductors 81 through 85 as shown. This would require an additional two counters in each circuit PSG and PSC for the additional two elements in the signals; and according to the parity signal $b$ in FIG. 2 the seventh counter will be connected to the previous six counters for forming the seventh element therefrom as previously described in section I above.

In FIG. 8 there is shown charts of three message signals and one parity signal of eight elements each arranged in a block according to still another embodiment of the principle of this invention. In this particular embodiment eight different marking and spacing frequencies are employed, which may be transmitted simultaneously, in each of the eight different signal channels. Thus, there is a choice of two frequencies in each channel lying about 100 cycles apart, one for marks and the other for spaces, with the center frequencies of each channel being spaced 200 cycles apart. In the chart in FIG. 8, the elements in columns 2 through 6 and rows I through III correspond to the elements of the three five-unit message code signals transmitted. Before each message signal in column 1 is added an element (circles with center dot) which may have the same polarity, and added two elements after each message signal (squares with center dots) in columns 7 and 8 represent the parity tests on the groups of preceding elements in the same row, namely; element 7 is produced from the elements 1, 3 and 5 in that row, and element 8 is produced from the elements 2, 4 and 6 in that row. The base of the block in FIG. 8, is shown an eight element parity signal (triangles with center dots) based on the elements along the diagonal lines shown in FIG. 8, for example, the first element of this parity signal is produced from the number of marks in the three row-column element positions of I-3, II-5 and III-7; etc., When the diagonal lines in the group do not have three elements in a straight line, they are connected around to the corresponding other ones of the matrix, group or block as shown by the arrowed lines in FIG. 8. Thus correlation between errors rendered in these sum tests is reduced by the frequency jumps between the successive letters, since it is not very probable that an error in unit or element or column 1 of the letter row I will coincide with an error in unit or column 3 of letter II, or unit 5 in letter III. Thus this diagonal test contrasts favorably with the vertical tests disclosed in FIGS. 1 and 2 and described above.

The element in column 1 can serve to form signal groups, and also may have a marking polarity, for example, for all the letter signals, so that if the first element has a spacing polarity the group following in the rows are service signals thereby having the possibility of producing 32 different service signals.

Thus this particular adaptation has additional double checking features, and the checking of the elements of the different columns, rows, diagonals, etc. depends upon where the counters of the parity signal generating and checking circuits PCG and PCC, are connected; that is to which conductors, between the element input circuits and the memory devices in each receiver and transmitter, the counters are connected, and to which, if any counters are connected to other counters. Thus, many different testing and parity checking systems can be provided for blocks or groups of elements and signals according to this invention.

While there is described above the principles of this invention in connection with specific apparatus, it is to be clearly understood that this description is made only by way of example and not as a limitation to the scope of this invention.

What is claimed is:

1. In a telecommunication system for multi-element code signals between two stations, each station having a transmitter and a receiver and each transmitter and receiver comprising:
   (A) separate input circuits for each element of each signal,
   (B) a storing means for a predetermined number of signals,
   (C) conductor means connected between each input circuit and said storing means, and
   (D) a repetition device for controlling said storing means, the improvement comprising:
      (1) a counter means in each receiver and transmitter connected to each conductor means for counting the number of elements of a given type along a predetermined line of a predetermined number of signals forming a block,
      (2) means in each transmitter connected to said counter means in that transmitter for generating a parity signal corresponding to the elements in said block for transmission after said block, and
      (3) means in each receiver connected to said counter means in that receiver for comparing said parity signal against the corresponding elements counted in said block of received signals, and controlling said associated repetition device in accordance therewith, so that erroneous blocks of signals will be requested to be repeated until received correctly.

2. A system according to claim 1 including
   (E) gate means in each said conductor means, and
   (F) pulse generating means for controlling said gate means, and wherein said means in each transmitter for generating said parity signal is controlled by its associated pulse generating means, and wherein said repetition device in each receiver is controlled by said pulse generating means.

3. A system according to claim 2 wherein said gate means includes AND gates in each transmitter and receiver connected to each conductor means.

4. A system according to claim 1, including:
   (4) a first code converter means connected to said conductor means in each transmitter in a predetermined way for converting said multi-element code signals into code signals of constant ratio of marks and spaces, and
   (5) a signal ratio test means connected to said conductor means in each receiver.

5. A system according to claim 4 including:
   (6) a second converter means connected to said conductor means in each receiver for converting said constant ratio code signals back to said multi-element code signals.

6. A system according to claim 5 wherein said first code converter means in said transmitter is connected to said conductor means after said counter means, and said second converter means in said receiver is connected to said conductor means before said counter means.

7. A system according to claim 1 wherein said system comprises a multi-channel system with a different channel corresponding to each element of the multi-element code signal transmitted between said stations.

8. A system according to claim 1 wherein said multi-element signals comprise binary elements corresponding to mark and space indications, and wherein the elements of said parity signal corresponds to the number of marks in predetermined lines of elements in said block of signals.

9. A system for protecting against transposition errors in multi-element signal telecommunications between at least two stations, each station having a transmitter and a receiver;
(A) each transmitter comprising:
(1) a multi-element signal input device,
(2) a storage device for a predetermined plurality of said multi-element signals consisting of a group of message signals plus a parity signal,
(3) separate conductors for each element of said signal between said input device and said storage device.
(4) a separate counter connected to each conductor for counting the number of elements of a given type along predetermined lines of said group of signals,
(5) means to generate a parity signal determined by said counters,
(6) means for transmitting said group of signals followed by said parity signal to the receiver at a remote station, and
(7) a repetition device controlled by the receiver at the same station and connected to said storage device for repeating said group of signals and said parity signal stored in said storing device; and
(B) each receiver comprising:
(1) means to receive each element of said multi-element signals transmitted from a remote station,
(2) a memory device for said group of message signals,
(3) separate conductor means for each element of said multi-element signal between each said receiving means and said memory device,
(4) a separate counter connected to said conductor means for counting the number of elements of said given type along said predetermined lines of said group of signals,
(5) means connected between said counters and said repetition device for comparing said counters with said parity signal, and
(6) a repetition requesting device controlled by said comparison means to control the repetition device in the transmitter at that station.

10. A system for protecting against transposition errors in multi-element signal telecommunications between at least two stations, each station having a transmitter and a receiver;
(A) each transmitter comprising:
(1) a multi-element signal input device,
(2) a storage device for a predetermined plurality of said multi-element signals consisting of a block of message signals plus a parity signal,
(3) separate conductors for each element of a signal between said input device and said storage device,
(4) a gate in each said conductor,
(5) a pulse generator means for controlling said gates,
(6) a code converter for converting each signal of said group into a signal of a constant ratio of marks and spaces, and controlled by said pulse generator means,
(7) a separate counter connected to each said conductor for counting the number of elements of a given type along predetermined lines of said group of signals,
(8) means controlled by said pulse generator to generate a parity signal determined by said counters,
(9) means for transmitting said group of signals followed by said parity signal to the receiver at a remote station, and
(10) a repetition device controlled by the receiver at the same station and connected to said storage device for repeating said group of signals and said parity signal stored in said storing device; and
(B) each receiver comprising:
(1) means to receive each element of said multi-element signal transmitted from a remote station,
(2) a memory device for said groups of message signals,
(3) separate conductor means for each element of said multi-element signal between each said receiving means and said memory device,
(4) means connected to said conductor means to test the ratio of mark and space elements in each signal,
(5) code converter means for converting said constant ratio code signals back into the multi-element code signals,
(6) a pulse generator means for controlling said memory device and said code converter means,
(7) separate counter means connected to each conductor means for counting the number of elements of said given type along said predetermined lines of said group of siganls,
(8) a repetition requesting device controlled by the said ratio tester to control the repetition device in the transmitter at that station, and
(9) gate means connected between said counter means and said repetition device for comparing the results of said counters with said parity signal also for controlling the operation of said repetition requesting device.

11. A system according to claim 10 wherein said code converter in said transmitter is connected to said conductor means after said counter means, and wherein said code converter means in said receiver is connected to said conductor means before said counter means.

12. A system according to claim 10 wherein said telecommunication system comprises a multi-channel system, and the number of channels corresponds to the number of elements in the code signals transmitted between said stations.

References Cited

UNITED STATES PATENTS

| | | | |
|---|---|---|---|
| 3,005,871 | 10/1967 | Rudolph | 178—26 |
| 3,147,460 | 9/1964 | Scott | 340—146.1 |
| 3,242,461 | 3/1966 | Silberg et al. | 340—146.1 |

MALCOLM A. MORRISON, *Primary Examiner.*

C. E. ATKINSON, *Assistant Examiner.*